United States Patent Office 3,406,172
Patented Oct. 15, 1968

3,406,172
2,2-BIS(4-CHLOROPHENYL)-2-CHLOROACETAMIDES
Colin R. McArthur, Camillus, N.Y., assignor to Allied Chemical Corporation, New York, N.Y., a corporation of New York
No Drawing. Filed June 25, 1964, Ser. No. 378,073
5 Claims. (Cl. 260—247.7)

This invention relates to the production of 2,2-bis(4-chlorophenyl)-2-chloroacetamides useful as active pesticidal toxicants.

Accordingly, one object of the invention is to provide new chemical compounds in the form of 2,2-bis(4-chlorophenyl)-2-chloroacetamides. Another object is the provision of a process for producing these new compounds. Still another object is the provision of 2,2-bis(4-chlorophenyl)-2-chloroacetamides for application as pesticides. Other objects and advantages of the invention will be apparent hereinafter.

In accordance with the above objects, the invention of this application is directed to compounds of the general formula:

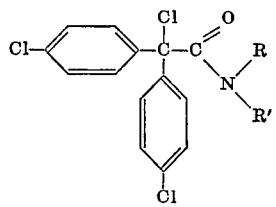

wherein R and R' are selected from the group consisting of hydrogen, alkyl, alkenyl, alkynyl, and aryl. These radicals can be acyclic, cyclic, or heterocyclic.

The alkyl, alkenyl, and alkynyl radicals represented by R and R' can contain from one to fifteen carbon atoms and preferably contain one to six carbon atoms. Typical examples are methyl, ethyl, isopropyl, 2,3-dichloropropyl, 1,3 - dihydroxy - 2 - methyl-2-propyl, butyl, 2-ethylhexyl, lauryl, cyclohexyl, allyl, 2-chloroallyl, cyclohexenyl, (1,4,5,6,7,7-hexachlorobicyclo(2·2·1)hept-5-en-2-yl, and propargyl.

Also, the two monovalent radicals R and R' may be joined to each other in the form of one divalent radical. Typical examples of divalent radicals are pentamethylene, in which case the resulting amide is 1-[2,2-bis(4-chlorophenyl)-2-chloroacetyl]-piperidine, and 2,2'-oxydiethyl, in which case the resulting amide is 4-[2,2-bis(4-chlorophenyl)-2-chloroacetyl]-morpholine.

The aryl radicals represented by R and R' can be homocyclic or heterocyclic and can contain from one to five rings and preferably contain from one to three rings. Typical examples are phenyl, 3,4 - dichlorophenyl, 4-nitrophenyl, p-biphenylyl, 4-tolyl, 1-naphthyl, 2-pyridyl, 3-quinolyl, 2-thiazolyl.

It is intended that the alkyl, alkenyl, alkynyl, and aryl radicals represented by R and R' include both unsubstituted and substituted radicals; that the aryl radicals include alkaryl radicals wherein the aliphatic portion is one of the named aliphatic radicals; that the aliphatic radicals include aralkyl radicals; and that the heterocyclic radicals contain N, O, S or P. The substituted portion of R and R' can contain the halogens, N, O, S and P, e.g., amino, nitro, hydroxy, oxy, carboxyl, carbonyl, and sulphonic groups.

Typical compounds of this invention are N-2,2-tris-(4-chlorophenyl)-2-chloroacetamide, which is represented by the following formula:

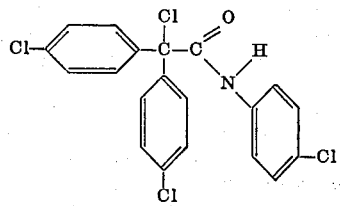

N-(3,4-dichlorophenyl) - 2,2 - bis-(4 - chlorophenyl)-2-chloroacetamide, which is represented by the following formula:

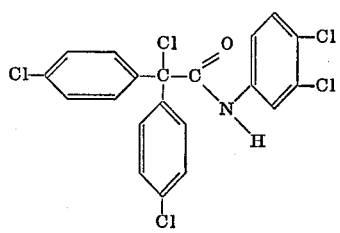

and N-allyl-2,2 - bis(4-chlorophenyl)-2-chloroacetamide, which is represented by the following formula:

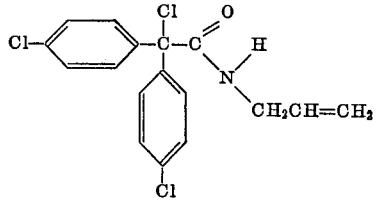

The acetamide compounds of this invention can be prepared by reacting bis(4-chlorophenyl)chloroacetyl chloride with a primary or secondary amine. The reaction is illustrated by the following general equation:

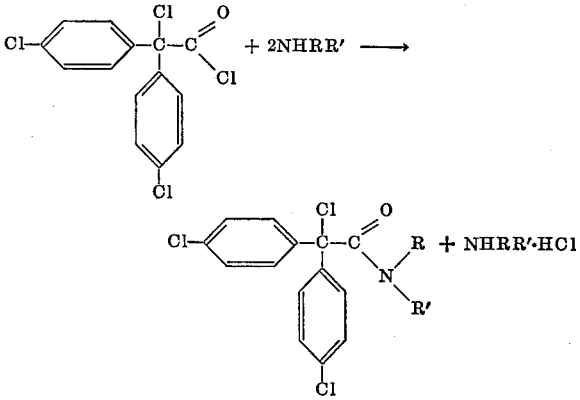

wherein R and R' are the same as noted supra.

The compounds of this invention are prepared by preferably first dissolving bis(4-chlorophenyl)-chloroacetyl chloride in an anhydrous volatile solvent such as anhydrous ether, benzene, methylene chloride, petroleum ether. The proportion of solute to solvent is not critical, but is preferably in the range of about 0.25 to about 3.0 parts by weight of chloride to one part by weight of solvent. The primary or secondary amine is also preferably first dissolved in a similar anhydrous volatile solvent in a ratio of about 0.1 to 1.0 part by weight of amine for each part by weight of solvent. This ratio of amine to solvent is also not critical. The use of solutions of the reactants is not required to obtain the desired product, but is the most practical mode of operation because of the high degree of reactivity of the chloride reactant. The solvent, of course, should be inert.

The chloride solution is preferably added to the amine solution dropwise. Agitation during this dropwise addition to chloride to amine is suggested.

The proportion of reactants can range from about 0.1 mol of chloride per mol of amine to about 1.5 mols of chloride per mol of amine. The preferred range of molar ratios of reactants is from about 0.4 mol of chloride per mol of amine to about 0.6 mol of chloride per mol of amine.

The reaction temperature can range from about −80 to about 200° C., and is preferably kept within a range of about −10 to about 20° C. Atmospheric pressure is adequate, but sub-atmospheric and super-atmospheric pressures can be used. Also, the reaction is generally conducted in air, but can be conducted under any inert gas, if desired.

After the addition of the chloride to the amine, the temperature of the reaction mixture is allowed to return to room temperature and the crystalline hydrochloride can be removed by filtration or other means such as centrifuging or dissolution in water. The filtrate, where filtration is used to remove the hydrochloride, can then be evaporated to obtain the acetamide product. For further purification, the acetamide can be washed with various volatile solvents such as petroleum ether, benzene, and chloroform.

Typical amine reactants include methylamine, dimethylamine, ethylamine, isopropylamine, allylamine, bis(2,3-dibromopropyl)amine, 2-amino-2-methyl-1,3-propanediol, dibutylamine, laurylamine, diallylamine, 2-chloroallylamine, cyclohexylamine, cyclohexenylamine, aniline, 4-chloroaniline, 3,4-dichloroaniline, N-methylaniline, piperidine, morpholine, 1 - naphthylamine, 2 - aminopyridine, p - toluidine, 3 - nitroaniline, 8 - amino - quinoline, and 2-amino-thiazole.

The following examples, in which parts are by weight, illustrate the preparation of compounds of my invention:

Example I

A solution of 33.4 parts of bis(4-chlorophenyl)-chloroacetyl chloride in 35.4 parts of anhydrous ether was added dropwise for one hour to a well agitated solution of 25.5 parts of 4-chloroaniline in 141.6 parts of anhydrous ether at −10 to 0° C. The reaction mixture was allowed to warm to room temperature and the crystalline 4-chloroaniline hydrochloride was removed by filtration. Evaporation of the ether filtrate and addition of petroleum ether (B.P. 65–110° C.) to the residue gave 42 parts (96.5%) yield of N,2,2-tris(4-chlorophenyl) - 2 - chloroacetamide, M.P. 113° C.

*Analysis.*—Calcd. for $C_2OH_{13}Cl_4NO$: Cl, 33.4%; N 3.3%. Found: Cl, 33.6%, N, 3.5%.

The infrared spectrum of this product has absorption bands assignable to a secondary amide (3300, 1680, 1530 cm.$^{-1}$), aromatic unsaturation (1500, 1600 cm.$^{-1}$), a phenyl group with two adjacent hydrogen atoms (830 cm.$^{-1}$), and a carbon-chlorine bond (665, 785 cm.$^{-1}$).

Example II 33.4 parts of bis(4-chlorophenyl)chloroacetyl-chloride was added to 25.5 parts of 3,4-dichloroaniline using the same method as that described in Example I, to give 26 parts (56.5%) yield of N-(3,4-dichlorophenyl)-2,2-bis(4-chlorophenyl)-2-chloroacetamide, M.P. 131–132° C.

*Analysis.*—Calcd. for $C_{20}H_{12}Cl_5NO$: Cl, 38.5%; N, 3.1%. Found: Cl, 37.8%; N, 3.2%.

The infrared spectrum of this product has absorption bands assignable to a secondary amide (3300, 1680, 1525 cm.$^{-1}$), aromatic unsaturation (1525, 1600 cm.$^{-1}$), a phenyl group with two adjacent hydrogen atoms (820 cm.$^{-1}$), and a carbon-chlorine bond (795 cm.$^{-1}$).

Example III 103.5 parts of bis(4-chlorophenyl)chloroacetyl-chloride were added to 37.2 parts of allylamine using the same method as that described in Example I, to give 99.0 parts (90% yield) of N-allyl-2,2-bis(4-chlorophenyl)2-chloroacetamide, M.P. 72–74.5° C.

*Analysis.*—Calcd. for $C_{17}H_{14}Cl_3NO$: C, 57.56%; H, 3.97%; Cl, 30.0%; N, 3.95%. Found: C, 57.70%; H, 3.85%; Cl, 30.11%; N, 4.19%.

The infrared spectrum of this product has absorption bands assignable to a secondary amide (3300, and 1655 cm.$^{-1}$), terminal olefinic unsaturation (1640 cm.$^{-1}$), aromatic unsaturation (1590 and 1500 cm.$^{-1}$), a paradisubstituted phenyl group (1090, 1012, and 820 cm.$^{-1}$), a vinyl group (990 and 912 cm.$^{-1}$), and a carbon-chlorine bond (760 and 790 cm.$^{-1}$).

Example IV

A solution of 7.1 parts of dimethylamine in 18 parts of diethyl ether was added to a stirred solution of 25.0 parts of bis(4-chlorophenyl)chloroacetyl chloride in 212 parts of diethyl ether while the temperature of the reaction mixture was maintained at 0–5° C. When the addition was complete, the mixture was allowed to warm to about 20° C. at which temperature it was maintained, with stirring, for about 40 min. Dimethylamine hydrochloride which had precipitated was removed by filtration, and the ether solution was concentrated to give 25 parts (97.5% yield) of N,N - dimethyl - 2,2 - bis(4 - chlorophenyl)-2-chloroacetamide, M.P. 119–121° C. A sample for analysis was obtained by washing the crystals with hexane, and drying.

*Analysis.*—Calcd. for $C_{16}H_{14}Cl_3NO$: Cl, 31.0%; N, 4.08%. Found: Cl, 31.5%; N, 4.0%.

The same procedure was followed in Table I infra:

TABLE I

| I[1] | | II[2] | | III | | | Product | | | |
|---|---|---|---|---|---|---|---|---|---|---|
| −R | −R[1] | Wt. (g.) | Moles | Amine reactants | Wt. (g.) | Moles | 2,2-bis(4-chlorophenyl)-2-chloroacetamide | Wt. (g.) | Yield (percent) | M.P. (° C.) |
| −H | −H | 30.0 | 0.09 | Ammonia | 3.1 | 0.18 | (Parent Amide) | 23.5 | 83.5 | 93–94 |
| −CH₃ | −H | 25.0 | 0.075 | Methylamine | 4.9 | 0.157 | N-methyl- | 19.0 | 77.0 | 108–111 |
| −CH₃ | −CH₃ | 25.0 | 0.075 | Dimethylamine | 7.1 | 0.157 | N,N-dimethyl- | 25.0 | 97.5 | 119–121 |
| −CH₂CH₃ | −H | 25.0 | 0.075 | Ethylamine | 6.75 | 0.15 | N-ethyl- | 25.0 | 97.5 | 89–90 |
| −CH₂CH₃ | −CH₂CH₃ | 25.0 | 0.075 | Diethylamine | 11.0 | 0.15 | N,N-diethyl- | 26.5 | 95.5 | 76–78 |
| −CH(CH₃)₂ | −H | 25.0 | 0.075 | Isopropylamine | 8.9 | 0.15 | N-isopropyl- | 26.5 | 94.0 | 131–133 |
| −CH(CH₃)₂ | −CH(CH₃)₂ | 25.0 | 0.075 | Diisopropylamine | 15.2 | 0.15 | N,N-diisopropyl- | 28.5 | 96.0 | |
| −CH₂CH₂−CH₂CH₃ | −H | 25.0 | 0.075 | Butylamine | 11.0 | 0.15 | N-butyl- | 27.0 | 97.0 | 85–87 |
| −CH₂CH₂−CH₂CH₃ | −CH₂CH₂−CH₂CH₃ | 25.0 | 0.075 | Dibutylamine | 20.2 | 0.157 | N,N-dibutyl- | 31.5 | 98.5 | |
| −(CH₂)₉CH₃ | −H | 25.0 | 0.075 | Decylamine | 23.8 | 0.15 | N-decyl- | 33.6 | 98.5 | |
| −CH₂CH=CH₂ | −CH₂CH=CH₂ | 25.0 | 0.075 | Diallylamine | 15.2 | 0.157 | N,N-diallyl- | 29.6 | 100.0 | |
| −C(CH₂OH)(CH₃)(CH₃) | −H | 21.0 | 0.063 | 2-amino-2-methyl-1-propanol | 11.2 | 0.126 | N-(2-methyl-1-hydroxy-2-propyl)- | 22.0 | 90.0 | 105–108 |

TABLE I—Continued

| I[1] -R | II[2] -R[1] | Wt. (g.) | Moles | Amine reactants | Wt. (g.) | Moles | Product 2,2-bis(4-chlorophenyl)-2-chloroacetamide | Wt. (g.) | Yield (percent) | M.P. (°C.) |
|---|---|---|---|---|---|---|---|---|---|---|
| -C(CH₂OH)(CH₂OH)(CH₃) | -H | 25.0 | 0.075 | 2-amino-2-methyl-1,3-propanediol. | 15.8 | 0.15 | N-(2-methyl-1,3-dihydroxy-2-propyl)- | 26.6 | 88.0 | 75-85 |
| -H | -C₆H₅ | 25.0 | 0.075 | Aniline | 14.0 | 0.15 | N-phenyl- | 26.0 | 89.0 | 108-110 |
| -H | -C₆H₄Cl (o) | 25.0 | 0.075 | o-Chloroaniline | 20.0 | 0.157 | N-(2-chlorophenyl)- | 29.0 | 91.0 | 80-84 |
| -H | -C₆H₄Cl (m) | 25.0 | 0.075 | m-Chloroaniline | 20.0 | 0.157 | N-(3-chlorophenyl)- | 27.0 | 85.0 | 102-104 |
| -H | -C₆H₃Cl₂ (2,5) | 17.7 | 0.053 | 2,5-dichloroaniline | 16.2 | 0.1 | N-(2,5-dichlorophenyl)- | 18.8 | 82.0 | 83-85 |
| -H | -C₆H₄CH₃ (o) | 25.0 | 0.075 | o-Toluidine | 16.0 | 0.15 | N-(o-tolyl)- | 24.5 | 81.0 | 73-76 |
| -H | -C₆H₄CH₃ (p) | 25.0 | 0.075 | p-Toluidine | 16.0 | 0.15 | N-(p-tolyl)- | 27.0 | 89.0 | 108-109 |
| -H | -C₆H₄NO₂ (m) | 25.0 | 0.075 | m-Nitroaniline | 20.8 | 0.15 | N-(3-nitrophenyl)- | 28.5 | 87.5 | 157-158 |
| -H | -C₆H₄NO₂ (p) | 25.0 | 0.075 | p-Nitroaniline | 20.8 | 0.15 | N-(4-nitrophenyl)- | 26.4 | 81.0 | ≈130 |
| -H | -C₆H₄OH (p) | 25.0 | 0.075 | p-Aminophenol | 16.5 | 0.157 | N-(4-hydroxyphenyl)- | 26.0 | 85.3 | 73-81 |
| -H | -C₆H₃(Cl)(CH₃) (3-Cl,4-CH₃) | 25.0 | 0.075 | 3-chloro-4-methylaniline. | 22.3 | 0.157 | N-(3-chloro-4-tolyl)- | 26.0 | 80.0 | 116-116.5 |
| -H | -C₆H₄NHC(O)CH₃ | 25.0 | 0.075 | 4-aminoacetanilide | 22.5 | 0.15 | N-(4-acetylaminophenyl)- | 19.0 | 57.0 | 198-200 |
| -H | 2-pyridyl | 25.0 | 0.075 | 2-aminopyridine | 14.1 | 0.15 | N-(2-pyridyl)- | 29.3 | 100.0 | |
| -H | cyclohexyl | 25.0 | 0.075 | Cyclohexylamine | 15.0 | 0.15 | N-cyclohexyl- | 28.0 | 93.5 | 115-116 |
| -H | 1-naphthyl | 25.0 | 0.075 | 1-naphthylamine | 21.5 | 0.15 | N-(1-naphthyl)- | 32.0 | 97.0 | |

[1] See formula NHRR' in column 2 supra.  [2] Bis (4-chlorophenyl) chloroacetyl chloride.

Example V

The same procedure used in Example IV was followed. 25 parts of bis(4-chlorophenyl)-chloroacetyl chloride was treated with 13.2 parts of morpholine to give 20.0 parts (70% yield) of 4-[2,2-bis(4-chlorophenyl)-2-chloroacetyl]-morpholine, (see structure below), M.P. 142-144° C.

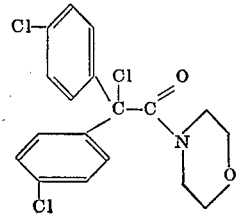

Example VI

N-allyl-2,2-bis(4-chlorophenyl)-2-chloroacetamide, prepared as described supra, underwent a Diels-Alder reaction with hexachlorocyclopentadiene, to give N-[(1,4,5,6,7,7-hexachlorobicyclo[2·2·1]hept-5-en - 2 - yl)methyl]-2,2-bis(4-chlorophenyl)-2-chloroacetamide. The equation is as follows:

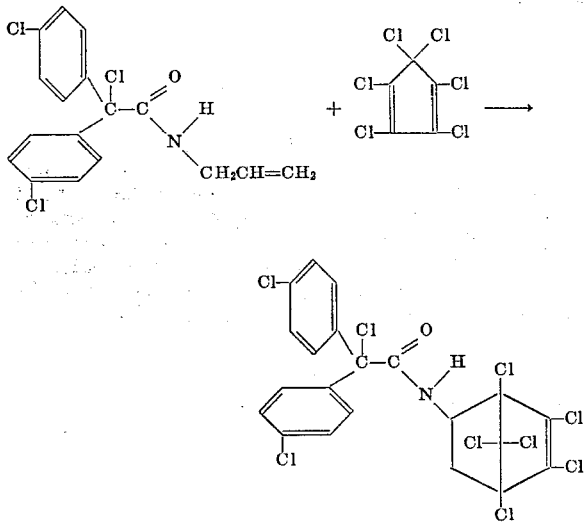

Thus, a mixture of 20 parts of N-allyl-2,2-bis(4-chlorophenyl)-2-chloroacetamide and 16 parts of hexachlorocyclopentadiene was heated at 140° C. for 7 hrs. The reaction mixture was then dissolved in a hot solution of 22 parts of benzene in 99 parts of hexane. On cooling, the solution deposited 26 parts (54% yield) of N-[(1,4,5,6,7,7-hexachlorobicyclo[2·2·1]hept-5-en-2-yl)methyl] - 2,2-bis(4-chlorophenyl)-2-chloroacetamide, M.P. 114–117° C.

As indicated above, the compounds of this invention find valuable application as pesticidal, including insecticidal and miticidal, toxicants. They are ordinarily applied as such in conjunction with a carrier which may be liquid, solid, or gaseous and, if desired, with secondary toxicants. The amounts of toxicant used may vary widely, a sufficient quantity being utilized to provide the desired toxicity.

Preferred formulations include wettable powders, dusts, emulsifiable oils, granules, and baits.

Wettable powders are water-dispersible compositions comprising active material, an inert solid, and one or more wetting agents. The inert solids are preferably of mineral origin and the wetting agents are preferably anionic or non-ionic. Suitable wetting agents for use in such compositions are listed by J. W. McCutcheon in "Soap and Chemical Specialties," December 1957, January, February, March and April 1958. The classes of solids most suitable for wettable powder formulations are the natural clays, diatomaceous earth, and synthetic mineral fillers derived from silica and silicate. Dispersing agents are also used in preparing these wettable powders. Wettable powder formulations may contain from about 15 to 80 weight percent active material, from about 1 to 5 weight percent wetting agent, from about 1 to 5 weight percent dispersant, and the remainder being inert solid. The wettable powder may also contain corrosion inhibitors or an anti-foaming agent or both.

Dusts are dense, free-flowing powder compositions which are intended to be applied in dry form. They are comprised of an active material and a dense, free-flowing solid. They may also contain a wetting agent and an inert, absorptive grinding aid. Suitable inert solids are organic or inorganic powders which possess high bulk, are free flowing, have relatively low surface area, and are poor in liquid absorption. Examples of preferred inert solids are micaceous talcs, dense kaolin clays and tobacco dust. The grinding aids are similar to those used as inert solids in the wettable powders. The wetting agents are also similar to those used in the wettable powder formulation. The dust compositions preferably comprise about 0.5 to 10 weight percent active material, and about 90 to 99 weight percent extender. Such dust formulations may contain dispersing agents, corrosion inhibitors, grinding aids, and anti-foam agents. Further, the wettable powders described above may also be used in the preparation of dusts with appropriate substitution of ingredients.

Emulsifiable oils are usually solutions of active material in water-immiscible solvents together with an emulsifying agent similar to the wetting agents referred to, supra. When the active component is itself a water-immiscible liquid, the emulsifiable oil may comprise an active material and emulsifying agent without a solvent. Suitable solvents are hydrocarbons, and non-water miscible ethers, esters, or ketones, e.g., benzene, alkylated naphthalenes, ethyl acetate, butyl ether, and di-butyl ketone. The emulsifiable compositions comprise from about 20 to 80 weight percent active material, about 80 to 20 weight percent solvent, and about 1 to 10 weight percent emulsifying agent. The resulting emulsifiable oil may be incorporated with water in a quantity sufficient to form an aqueous spray dispersion or emulsion having the desired active ingredient concentration. The aqueous spray dispersion preferably should contain the active ingredient in an amount not less than 0.125 pound per hundred gallons.

Granules comprise active material absorbed in or intermingled with an inert carrier. A wetting agent may be present as a leaching aid. The inert carrier and the wetting agent are similar to the inert solids and wetting agents referred to, supra. The granule can be either composed of a material which will absorb the active liquid material or it can be non-absorbent, wherein the granular material is blended and mixed with the active liquid material. The preferred granular formulations comprise about 20 to 60 mesh granules containing from about 0.5 to 10 weight percent active material and about 90 to 99 weight percent inert carrier.

Baits are mixtures of active material with substances which are attractive to pests such as food or breeding materials. General examples of foods cover inexpensive natural sweetening agents, fats, and proteins. Specific examples are sugar, wheat, bran, peanut butter, and lard. The baits can be in liquid, paste, or solid forms and preferably contain about 0.1 to 1.0% by weight of active material.

The compounds N,2,2-tris(4-chlorophenyl)-2-chloroacetamide; N-(3,4-dichlorophenyl) - 2,2 - bis(4-chlorophenyl)-2-chloroacetamide; and N-allyl-2,2-bis(4-chlorophenyl)-2-chloroacetamide were tested for pesticidal activity as shown in the following examples:

Example I

Finely divided aqueous suspensions of various concentrations of N,2,2-tris(4-chlorophenyl)-2-chloroacetamide and N - (3,4-dichlorophenyl)-2,2-bis(4-chlorophenyl)-2-chloroacetamide were prepared by dispersing an acetone solution of each compound (5 parts of acetamide per 95 parts of acetone) in the appropriate quantity of water. These preparations were applied to the leaves of horticultural cranberry bean plants which were subsequently infested with *Prodenia eridania* (Southern armyworm) larvae. After three days, the percent mortality of the larvae was determined. The results are shown in Tables II and III:

TABLE II

Compound: N,2,2-tris (4-chlorophenyl)-2-chloroacetamide
Species: *Prodenia eridania*

| | | | | |
|---|---|---|---|---|
| Concentration (oz./100 gal. water) | 32 | 16 | 8 | 4 |
| Mortality after 3 days (percent) | 100 | 100 | 100 | 100 |

TABLE III

| Compound: N-(3,4-dichlorophenyl)-2,2-bis(4-chlorophenyl)-2-chloroacetamide Species: *Prodenia eridania* | | | | |
|---|---|---|---|---|
| Concentration (oz./100 gal. water) | 32 | 16 | 8 | 4 |
| Mortality after 3 days (percent) | 100 | 100 | 100 | 100 |

Example II

N-allyl-2,2-bis(4-chlorophenyl) - 2 - chloroacetamide is useful in controlling mites. Finely divided aqueous-acetone suspensions of various concentrations of this compound were prepared by dispersing an acetone solution of the compound (5 parts of acetamide per 95 parts of acetone) in the appropriate quantity of water. Such preparations were applied to the leaves of young horticultural cranberry bean plants which had been infested one day earlier with two-spotted spider mites (*Tetranychus telarius*). Three days after treatment, the percent mortality of mites was determined. The results are summarized in Table IV.

TABLE IV

| Compound: N-allyl-2,2-bis(4-chlorophenyl)-2-chloroacetamide Species: *Tetranychus telarius* | | | | |
|---|---|---|---|---|
| Concentration (oz./100 gal. water) | 16 | 8 | 4 | 2 |
| Mortality after 3 days (percent) | 100.0 | 100.0 | 85.7 | 91.4 |

I claim:
1. A compound having the following formula:

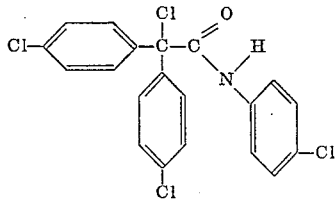

2. A compound having the following formula:

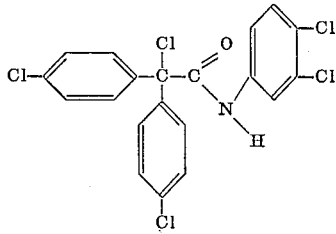

3. A compound having the following formula:

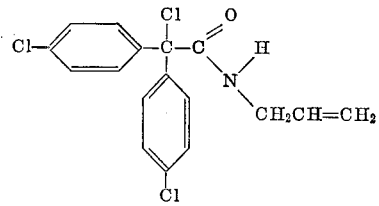

4. A compound having the following formula:

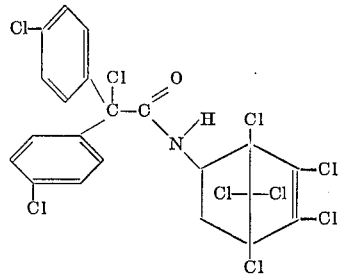

5. A compound having the following formula:

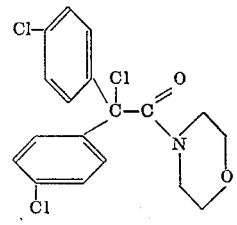

References Cited

UNITED STATES PATENTS
2,362,614  11/1944  Calva _____ 167—22
2,606,910  8/1952  Herzfeld et al. _____ 260—346.6

FOREIGN PATENTS
947,135  1/1964  Great Britain.

NICHOLAS S. RIZZO, *Primary Examiner.*

JOSE TOVAR, *Assistant Examiner.*